US012746556B2

(12) United States Patent

Yamaguchi et al.

(10) Patent No.: US 12,746,556 B2

(45) Date of Patent: Sep. 29, 2026

(54) CONSTRUCTION APPARATUS

(71) Applicant: JDC Corporation, Tokyo (JP)

(72) Inventors: Ryota Yamaguchi, Tokyo (JP); Masaaki Kusano, Tokyo (JP); Hiroyuki Kurokawa, Tokyo (JP); Ryusei Miyake, Tokyo (JP)

(73) Assignee: JDC Corporation, Tokyo (JP)

( * ) Notice: Subject to any disclaimer, the term of this patent is extended or adjusted under 35 U.S.C. 154(b) by 434 days.

(21) Appl. No.: 18/552,399

(22) PCT Filed: Dec. 8, 2021

(86) PCT No.: PCT/JP2021/045190

§ 371 (c)(1),
(2) Date: Sep. 25, 2023

(87) PCT Pub. No.: WO2022/209025

PCT Pub. Date: Oct. 6, 2022

(65) Prior Publication Data

US 2024/0173722 A1 May 30, 2024

(30) Foreign Application Priority Data

Mar. 29, 2021 (JP) ................................ 2021-055870

(51) Int. Cl.

*B02C 23/02* (2006.01)
*B65G 41/00* (2006.01)
*E02F 7/06* (2006.01)

(52) U.S. Cl.

CPC ............ *B02C 23/02* (2013.01); *B65G 41/005* (2013.01); *E02F 7/06* (2013.01); *B65G 41/002* (2013.01); *B65G 2812/015* (2013.01)

(58) Field of Classification Search

CPC ..... B02C 23/02; E02F 7/06; B65G 2812/015; B65G 41/002; B65G 41/005

(Continued)

(56) References Cited

U.S. PATENT DOCUMENTS 2,805,760 A * 9/1957 Von Stroh ............. B65G 37/00 198/584
3,003,612 A * 10/1961 Poundstone ........... E21F 13/02 198/497

(Continued)

FOREIGN PATENT DOCUMENTS

CN 108160695 A 6/2018
DE 102019133444 A1 * 6/2021 .......... E01C 23/088

(Continued)

*Primary Examiner* — James R Bidwell

(74) *Attorney, Agent, or Firm* — Young Basile Hanlon & MacFarlane. P.C.

(57) ABSTRACT

A mixing system includes a soil mixing device that crushes and grinds construction generated soil and a feed belt conveyor that is engaged with the soil mixing device and conveys the construction generated soil to the soil mixing device. In the feed belt conveyor, the number of degrees of freedom regarding rotation of a cylindrical member engaged with the soil mixing device differs from the number of degrees of freedom regarding rotation of a spherical bearing mechanism abutting on the ground. This configuration allows a plurality of units to be easily installed in an appropriate positional relation at a construction site or the like.

14 Claims, 13 Drawing Sheets

(58) Field of Classification Search
USPC ...................................... 198/303, 584, 861.4
See application file for complete search history.

(56) References Cited

U.S. PATENT DOCUMENTS

| | | | | | |
|---|---|---|---|---|---|
| 3,561,622 | A | * | 2/1971 | Dioguardi | B60P 1/52 198/584 |
| 4,646,906 | A | * | 3/1987 | Wilcox, Jr | B65G 21/14 198/589 |
| 4,776,449 | A | * | 10/1988 | Hoffmann | B65G 41/002 198/584 |
| 5,190,147 | A | * | 3/1993 | Pennington | B65G 23/44 198/861.2 |

FOREIGN PATENT DOCUMENTS

| | | | | | |
|---|---|---|---|---|---|
| JP | H06-010400 | B2 | | 2/1994 | |
| JP | 2000-238030 | A | | 9/2000 | |
| JP | 2003-071427 | A | | 3/2003 | |
| JP | 2003-120188 | A | | 4/2003 | |
| JP | 2005-066711 | A | | 3/2005 | |
| JP | 2011-156735 | A | | 8/2011 | |
| KR | 20130021759 | A | * | 3/2013 | B65G 47/644 |

* cited by examiner

CONSTRUCTION APPARATUS

TECHNICAL FIELD

The present invention relates to a construction apparatus.

BACKGROUND

As a soil improving machine, a self-propelled apparatus and a plant-type apparatus have been known (see, for example, JP Patent Publication No. JP 2003-071427 A and JP Patent Publication No. JP 2011-156735 A).

The plant-type apparatus includes a plurality of units. These units need to be carried to a construction site or the like and installed to have an appropriate positional relation. When a plurality of units are installed on a floor surface in a building or an iron plate laid on the ground, it is common to perform marking at the installation positions in advance and install the units at the marked positions.

These units also need to be mechanically fixed to the floor surface or the iron plate by, for example, welding an angle member so as not to move their positions.

SUMMARY

It takes time and effort to mark the floor surface or the iron plate and to mechanically fix each unit thereto. An apparatus including a plurality of units has the same problem, regardless of whether the apparatus is a soil improving machine or other apparatuses installed at a construction site, a building site, or the like.

An object of the present invention is to provide a construction apparatus that enables a plurality of units to be easily installed at a construction site or the like in an appropriate positional relation. Another object of the present invention is to provide a construction apparatus having good maintainability.

In an aspect of this disclosure, a construction apparatus includes a first unit configured to execute a first process on a processing object and a second unit abutting on an installation surface. The second unit is engaged with the first unit, and the second unit is configured to execute a second process on the processing object. The number of degrees of freedom regarding rotation of a first portion of the second unit, the first portion being engaged with the first unit, differs from the number of degrees of freedom regarding rotation of a second portion of the second unit, the second portion abutting on the installation surface.

In another aspect of this disclosure, the construction apparatus includes a container that includes a tapered portion having an internal tapered shape and into which a processing object including raw material soil is fed, a crushing part disposed in the container and configured to crush the processing object, and a scraping part configured to scrape the processing object adhering to the tapered portion. The scraping part has a shape conforming to the shape of the tapered portion.

According to the teachings herein, a plurality of units can be easily installed at a construction site or the like in an appropriate positional relation. Because the plurality of units are installed in an appropriate positional relation, unit replacement is facilitated, whereby maintainability can be improved.

According to the teachings herein, the processing object adhering to the tapered portion of the container can be scraped off. This enables a construction apparatus with improved maintainability.

DETAILED DESCRIPTION

The following describes a mixing system and an assembling method according to an embodiment in detail with reference to FIGS. 1 to 12.

Figure 1:
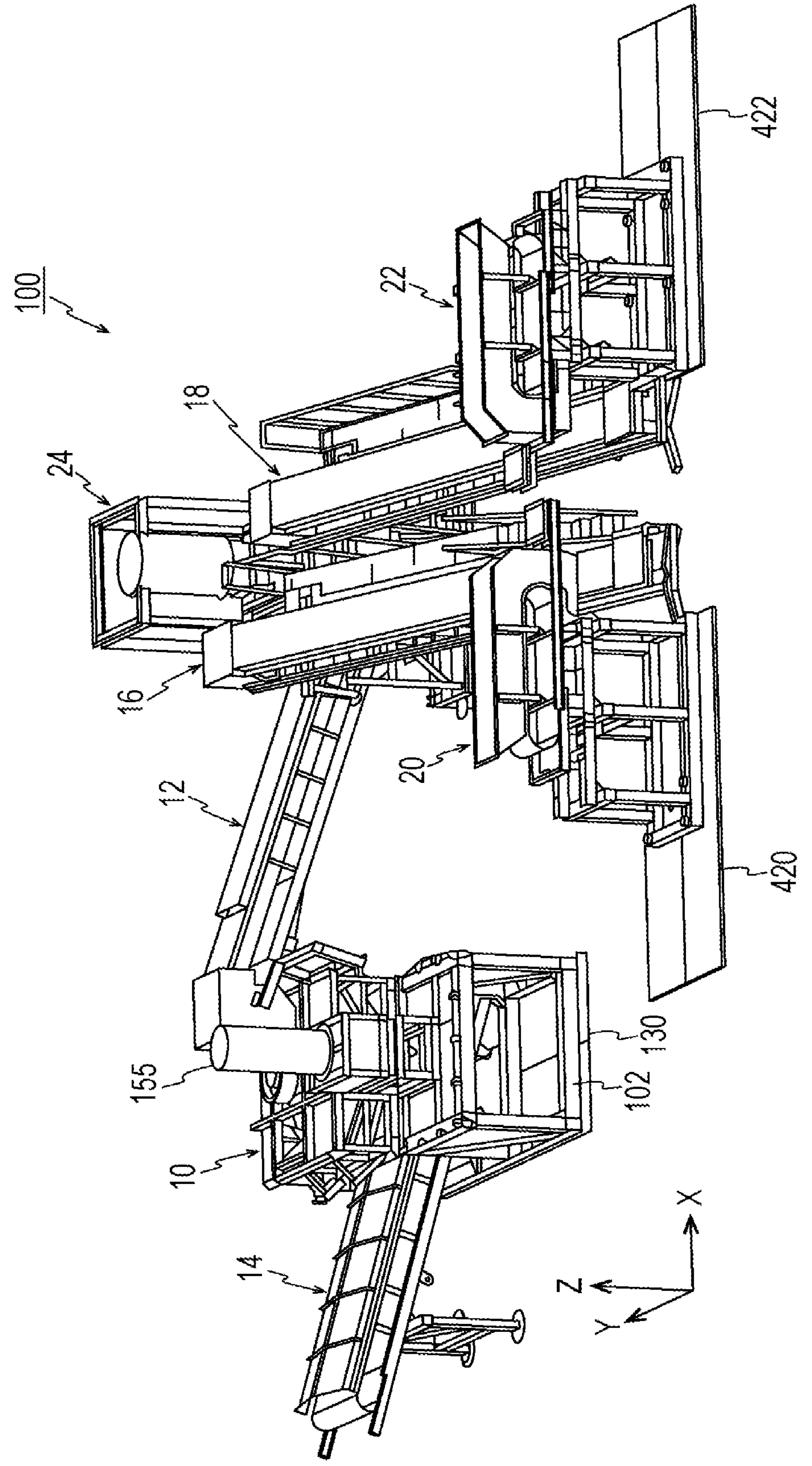
FIG. 1 is a perspective view of a mixing system according to an embodiment.

FIG. 1 is a perspective view of a mixing system 100 as a construction apparatus according to the embodiment. The mixing system 100 in FIG. 1 is installed at a construction site or the like.

As illustrated in FIG. 1, the mixing system 100 includes a soil mixing device 10 (also called a twister) as a rotary crushing part, a feed belt conveyor 12, a discharge belt conveyor 14, measuring belt conveyors 16 and 18 as subunits, apron feeders 20 and 22, and a powder feeder 24. In FIG. 1, the vertical direction is defined as the Z-axis direction. In the plane orthogonal to the Z-axis in FIG. 1, the left-right direction is defined as the X-axis direction and the depth direction is defined as the Y-axis direction.

Soil Mixing Device 10

The soil mixing device 10 includes an impact application member (also called an impact member) that rotates at a high speed in a cylindrical container. The soil mixing device crushes and grinds construction generated soil fed into the container with the impact force of the impact member. In other words, the soil mixing device 10 corresponds to a first unit, and the process performed (e.g. executed) by the soil mixing device 10 corresponds to a first process. The construction generated soil fed into the soil mixing device 10 can be mixed with additives (e.g., lime-based binders such as quicklime and slaked lime, cementitious binders such as ordinary cement and blast furnace slag cement, soil improving materials made of polymer materials, or natural fibers) as necessary. Accordingly, it is possible to adjust, for example, the properties and strength of the improved soil.

Figure 2:
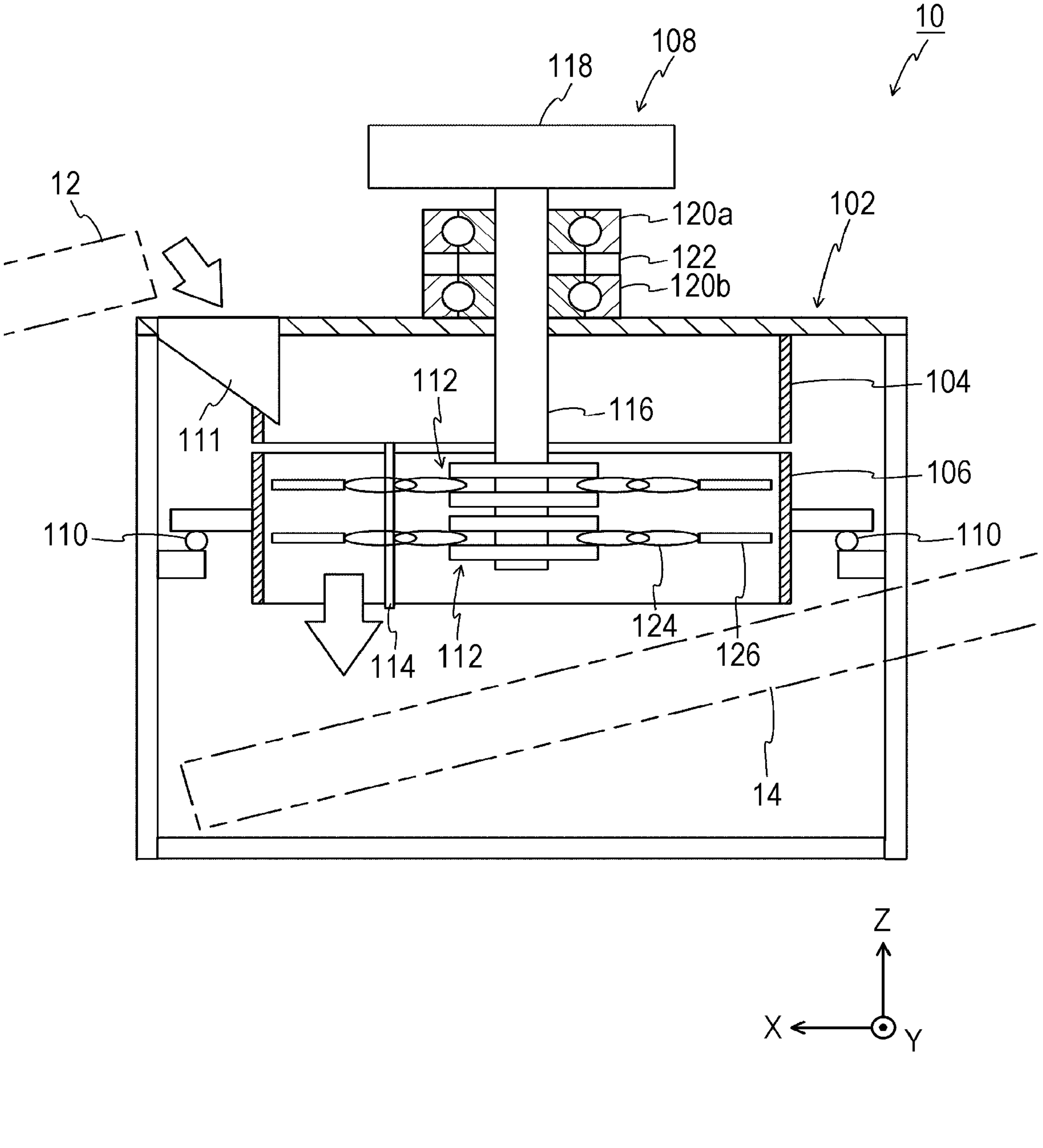
FIG. 2 is a partial sectional view of a soil mixing device.

FIG. 2 is a partial sectional view illustrating the soil mixing device 10 seen from the +Y side. As illustrated in FIG. 2, the soil mixing device 10 includes a stand 102, a fixed drum 104, a rotary drum 106, and a rotation mechanism 108.

The stand 102 holds each part of the soil mixing device 10. The fixed drum 104 is a cylindrical container and is fixed to the stand 102. A processing object is fed into the fixed drum 104 via a feeding port member 111, and the fixed drum 104 guides the processing object (e.g., construction generated soil) into the rotary drum 106 disposed at the lower side (on the −Z side) of the fixed drum 104.

The rotary drum 106 is a cylindrical container and rotates about the center axis of the cylinder (about the Z-axis) by a rotary drum driving motor (not illustrated). The rotary drum 106 is supported by the stand 102 via a plurality of support rollers 110, and the rotary drum 106 smoothly rotates upon receiving the rotational force of the rotary drum driving motor. The rotation direction of the rotary drum 106 and the rotation direction of the impact member 112 may be the same direction or opposite directions.

Inside the rotary drum 106, one or a plurality of scraping rods 114 (also called scrapers) are provided. Each scraping rod 114 is in contact with the inner surface of the rotary drum 106 and is fixed to the fixed drum 104. Thus, rotation of the rotary drum 106 relatively moves the scraping rod 114 along the inner surface of the rotary drum 106. This configuration allows, when the processing object adheres to the inner surface of the rotary drum 106, the rotary drum 106 to rotate to cause the processing object to be scraped off by the scraping rod 114 as the rotary drum 106 rotates.

The rotation mechanism 108 includes a rotation shaft 116 disposed at the center of the fixed drum 104 and the rotary drum 106 and extending in the vertical direction (Z-axis direction), a pulley 118 disposed at the upper end of the rotation shaft 116, and two impact members 112 disposed at an upper stage and a lower stage near the lower end of the rotation shaft 116.

The rotation shaft 116 is a columnar member and is rotatably held by the stand 102 via two ball bearings 120*a* and 120*b* disposed on the upper surface of the stand 102. A spacer 122 is provided between the two ball bearings 120*a* and 120*b* and defines a certain space between the ball bearings 120*a* and 120*b*. The lower end of the rotation shaft 116 is located inside the rotary drum 106 and is a free end. In other words, the rotation shaft 116 is cantilevered.

The pulley 118 is connected to a motor 155 (see FIG. 1) via a belt. As the motor 155 rotates, the pulley 118 and the rotation shaft 116 rotate.

The impact members 112 disposed at the two stages each have a plurality of (for example, four) metal chains 124. A steel plate 126 is provided at the distal end of each chain 124. The chains 124 are disposed at regular intervals around the rotation shaft 116.

The impact members 112 are rotated centrifugally by the rotation of the rotation shaft 116, and the plates 126 move at a high speed near the inner surface of the rotary drum 106, thereby crushing or mixing the processing object. The number of the chains 124 and the plates 126 of the impact members 112 can be adjusted in accordance with, for example, the type or properties of the raw material soil, the processing amount, the type and amount of the additives, and the target quality of the improved soil.

In the soil mixing device 10, when a processing object is conveyed by the feed belt conveyor 12 and fed into the fixed drum 104 through the feeding port member 111, the processing object is crushed and mixed by the impact members 112 in the rotary drum 106 and discharged to the lower side of the rotary drum 106. The discharge belt conveyor 14 is disposed below the rotary drum 106, and the processing object discharged to the lower side of the rotary drum 106 is conveyed by the discharge belt conveyor 14 in the −X direction and the +Z direction in FIG. 2.

In the present embodiment, using the rotation mechanism 108 including the two ball bearings 120*a* and 120*b* as described above enables a shorter rotation shaft 116 and a smaller deflection amount of the rotation shaft 116 while maintaining the crushing and mixing performance. This configuration allows the soil mixing device 10 to be smaller in height.

Returning to FIG. 1, the soil mixing device 10 (using the stand 102) is installed on an iron plate 130 laid on the ground. Because the ground below the iron plate 130 is leveled, the upper surface of the iron plate 130 is horizontal. Thus, the soil mixing device 10 is installed without inclination (e.g., with the rotation shaft 116 extending in the Z-axis direction).

Discharge Belt Conveyor 14

Figure 3A:
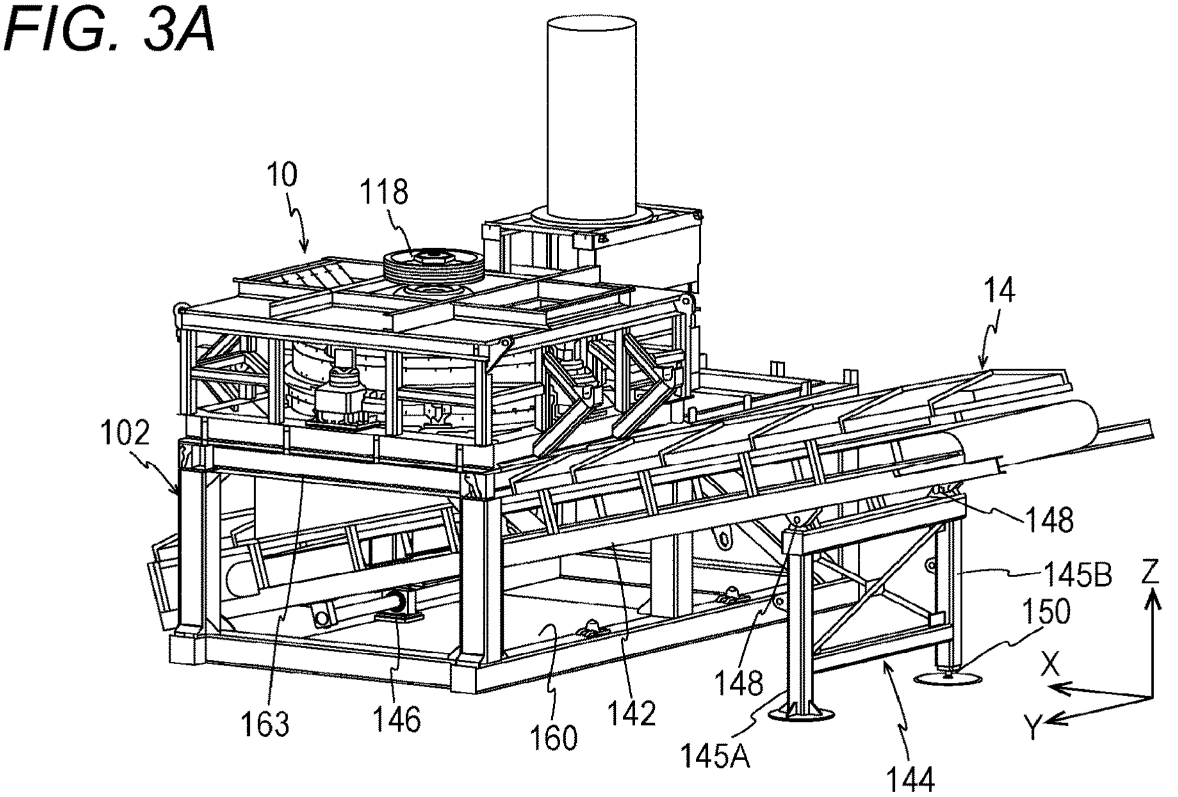
FIG. 3A is a perspective view of a discharge belt conveyor and the soil mixing device.
Figure 3B:
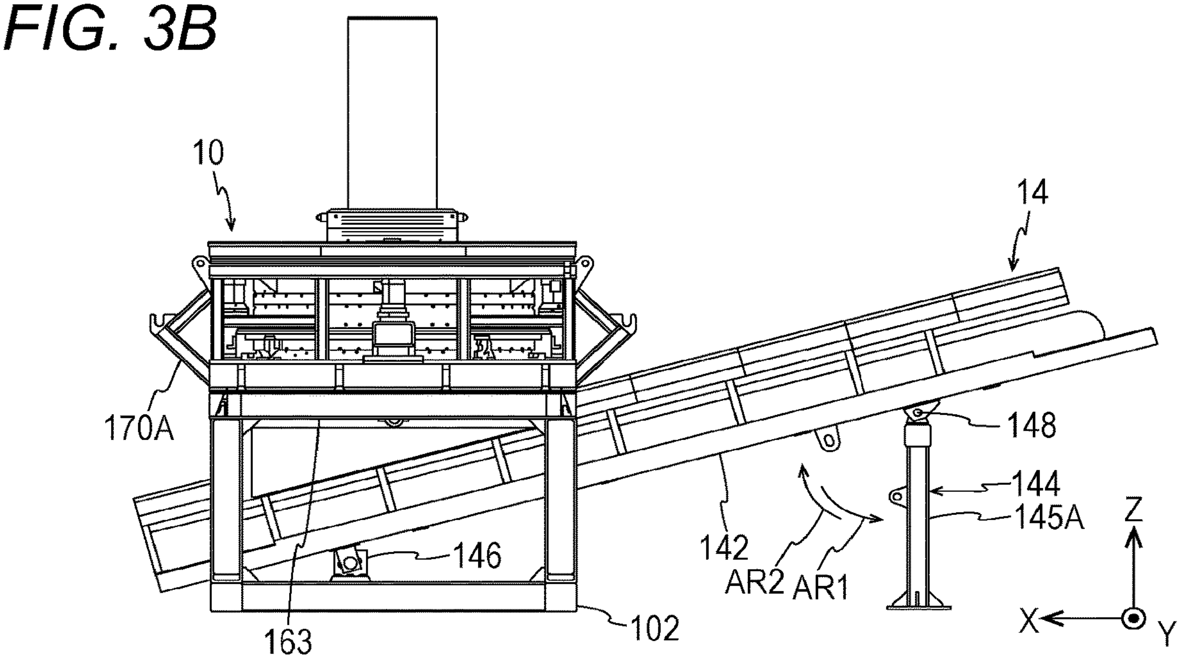
FIG. 3B is a view illustrating the discharge belt conveyor and the soil mixing device seen from the +Y side.

FIG. 3A is a perspective view of the discharge belt conveyor 14 and the soil mixing device 10, and FIG. 3B is a view (e.g., a side view) illustrating the discharge belt conveyor 14 and the soil mixing device 10 seen from the +Y side.

As illustrated in FIGS. 3A and 3B, the discharge belt conveyor 14 includes a conveyor main body 142, a front leg 144, and a spherical bearing mechanism 146.

The conveyor main body 142 includes a belt that conveys the processing object that has been crushed and mixed and then discharged from the soil mixing device 10 in the −X direction and the +Z direction.

The front leg 144 is disposed close to an end portion on the −X side of the bottom surface of the conveyor main body 142 via rotation shafts 148. When installed at the construction site, the front leg 144 is opened in the direction of arrow AR1 illustrated in FIG. 3B and stands vertically on the ground as illustrated in FIG. 3B. In other words, the discharge belt conveyor 14 is capable of standing in a self-standing manner. At the time of transportation of the discharge belt conveyor 14, the front leg 144 is rotated in the direction of arrow AR2 illustrated in FIG. 3B and folded. This configuration can reduce the volume of the discharge belt conveyor 14 at the time of transportation, making transportation easier.

The front leg 144 has two leg portions 145A and 145B extending in the Z-axis direction in the state of FIG. 3A. As illustrated in FIG. 3A, the leg portion 145B is provided with a screw-type height adjustment mechanism 150. The height adjustment mechanism 150 allows for adjustment of the length of the leg portion 145B and enables the front leg 144 to be installed on the ground without rattling.

Figure 4:
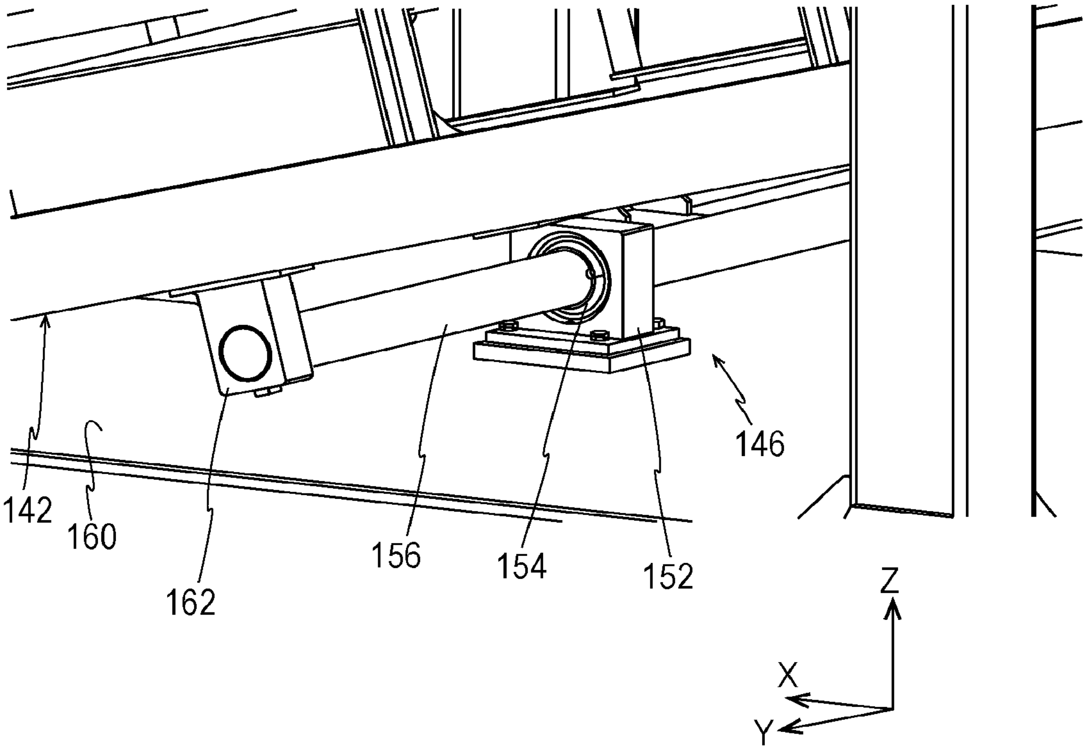
FIG. 4 is an enlarged perspective view illustrating a spherical bearing mechanism included in the discharge belt conveyor.

The spherical bearing mechanism 146 is disposed close to an end portion on the +X side of the bottom surface of the conveyor main body 142. FIG. 4 is an enlarged perspective view illustrating the spherical bearing mechanism 146. As illustrated in FIG. 4, the spherical bearing mechanism 146 includes a housing 152, a spherical bearing member 154 disposed in the housing 152, and a cylindrical member 156 disposed through the spherical bearing member 154.

The housing 152 is fixed to a floor member 160 of the stand 102 with, for example, bolts. The housing 152 has a spherical internal space capable of accommodating the spherical bearing member 154.

The spherical bearing member 154 is a substantially ball-shaped member. The spherical bearing member 154 has a through hole extending in the Y-axis direction and the cylindrical member 156 is disposed through the through hole. The spherical bearing member 154 can freely rotate relative to the housing 152 unless the cylindrical member 156 and the housing 152 mechanically interfere with each other. In other words, the spherical bearing member 154 is rotatable relative to the housing 152 in the rotation direction about the X-axis, the rotation direction about the Y-axis, and the rotation direction about the Z-axis.

Fixing members 162 are provided at respective ends of the cylindrical member 156. The cylindrical member 156 is fixed to the bottom surface of the conveyor main body 142 via the fixing members 162.

Figure 12:
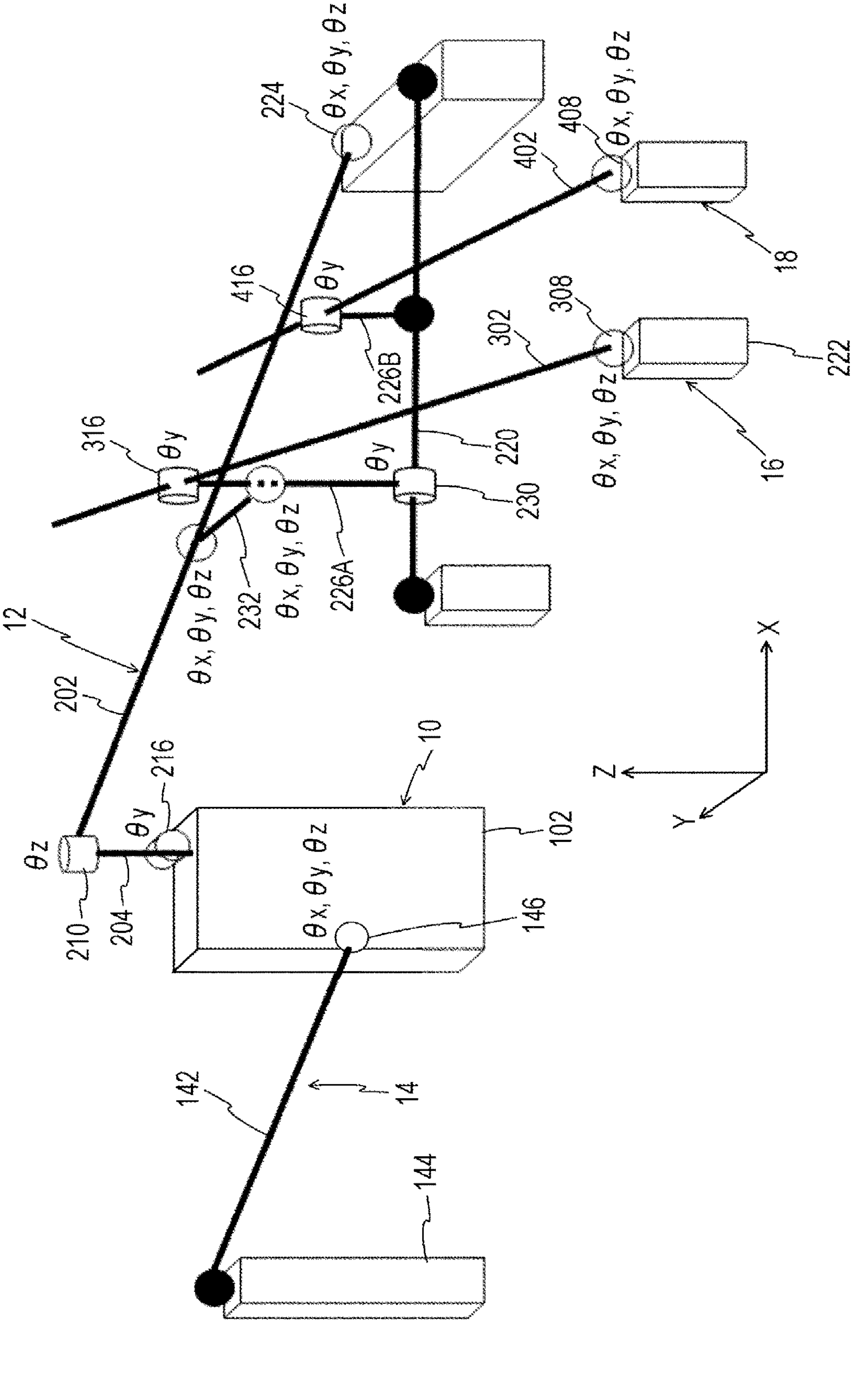
FIG. 12 is a schematic view illustrating degrees of freedom of portions in the mixing system according to the embodiment of FIG. 1.

FIG. 12 schematically illustrates degrees of freedom of portions in the mixing system 100 in the present embodiment. As illustrated in FIG. 12, the discharge belt conveyor 14 has a fixed portion (shown as • in FIG. 12) between the front leg 144 and the conveyor main body 142. The spherical bearing mechanism 146 allows the conveyor main body 142 to have a positional change (θx) in the rotation direction about the X-axis, a positional change (θy) in the rotation direction about the Y-axis, and a positional change (θz) in the rotation direction about the Z-axis relative to the floor member 160. Adjusting the front leg 144 can appropriately position the conveyor main body 142 (in a predetermined position relative to the ground axis).

In the present embodiment, to install the discharge belt conveyor 14 at the construction site, the discharge belt conveyor 14 is suspended by a crane or the like and is installed to the position shown in FIG. 3A (onto the floor member 160 of the stand 102) from above with the stand 102 of the soil mixing device 10 being installed on the iron plate 130. As illustrated in FIG. 3A, the stand 102 has beam members 163 extending in the X-axis direction but has no beam member 163 extending in the Y-axis direction, thereby allowing the discharge belt conveyor 14 to be installed from above the stand 102. When the discharge belt conveyor 14 is carried in, the front leg 144 is in a folded state. After the discharge belt conveyor 14 is brought above the floor member 160, a worker opens the front leg 144 in the direction of arrow AR1 and stands the front leg 144 on the ground. The worker then fixes the housing 152 of the spherical bearing member 154 to the floor member 160 with bolts or the like. The worker adjusts the height adjustment mechanism 150 of the front leg 144 to appropriately position the conveyor main body 142. Because the conveyor main body 142 is supported by the spherical bearing mechanism 146, the position of the conveyor main body 142 is changed in accordance with the adjustment of the height adjustment mechanism 150. Because the front leg and the conveyor main body have been separated in a conventional technique, the worker has erected the front leg at the construction site and performed a falling prevention measure and then installed the conveyor main body from above. The discharge belt conveyor 14, however, can be installed at the construction site without such efforts.

Feed Belt Conveyor 12

Figure 5A:
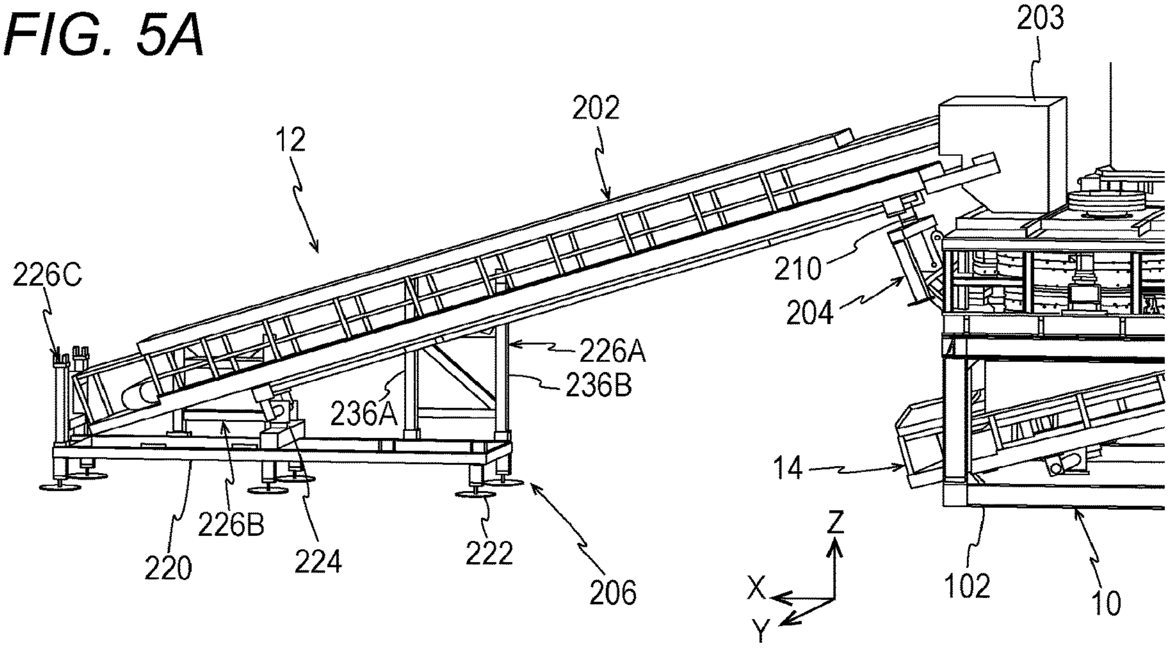
FIG. 5A is a perspective view of a feed belt conveyor and the soil mixing device.
Figure 5B:
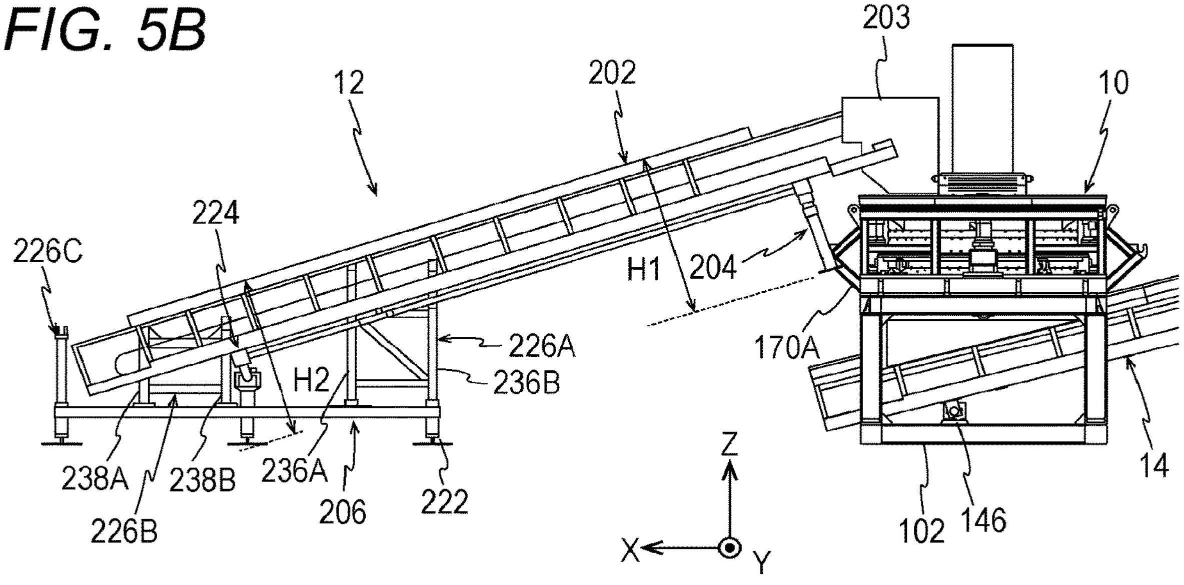
FIG. 5B is a view illustrating the feed belt conveyor, the soil mixing device, and a part of the discharge belt conveyor seen from the +Y direction.

Returning to FIG. 1, the feed belt conveyor 12 is connected to the soil mixing device 10 at a portion close to the −X end. In other words, the feed belt conveyor 12 corresponds to a second unit, and the process performed (e.g., executed) by the feed belt conveyor 12 corresponds to a second process. FIG. 5A is a perspective view of the feed belt conveyor 12 and the soil mixing device 10, and FIG. 5B is a view illustrating the feed belt conveyor 12, the soil mixing device 10, and a part of the discharge belt conveyor 14 seen from the +Y direction.

The feed belt conveyor 12 includes a conveyor main body 202, a front leg 204, and a tail stand 206.

The conveyor main body 202 includes a belt that conveys additives supplied from the powder feeder 24 (see FIG. 1), construction generated soil (hereinafter referred to as a first base material) supplied from the measuring belt conveyor 16 (see FIG. 1), and construction generated soil (hereinafter referred to as a second base material) supplied from the measuring belt conveyor 18 (see FIG. 1) to the soil mixing device 10. At an end portion on the −Y side of the conveyor main body 202, a guide member 203 is provided that guides the base materials conveyed by the conveyor main body 202 to the feeding port member 111 (see FIG. 2) of the soil mixing device 10.

The front leg 204 is disposed close to an end portion on the −X side of the bottom surface of the conveyor main body 202. As illustrated in FIG. 5A, the front leg 204 is disposed on the bottom surface of the conveyor main body 202 via a Z rotation shaft 210. Strictly speaking, the Z rotation shaft 210 rotates about an axis inclined from the Z-axis, but for convenience of description, the Z rotation shaft 210 is described as a shaft that rotates about the Z-axis (θz direction).

Figure 6A:
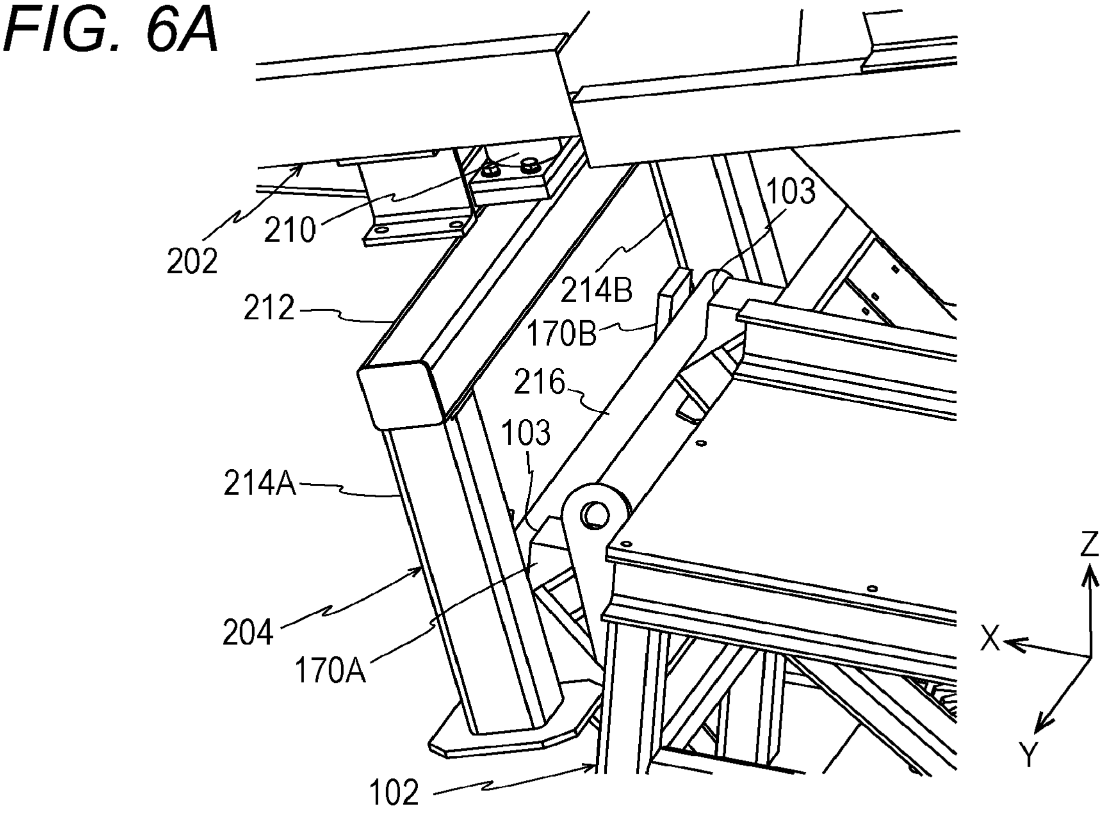
FIG. 6A is an enlarged perspective view illustrating the vicinity of a front leg of the feed belt conveyor.
Figure 6B:
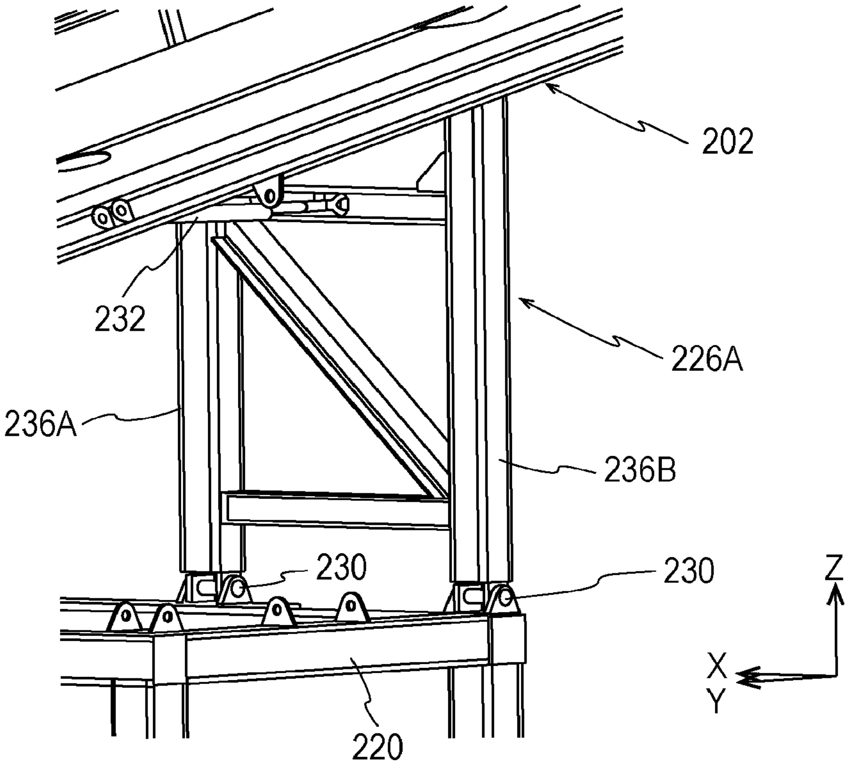
FIG. 6B is an enlarged perspective view illustrating the vicinity of a support mechanism of the feed belt conveyor.

FIG. 6A is an enlarged view illustrating the vicinity of the front leg 204. As illustrated in FIG. 6A, the front leg 204 includes a first member 212 extending in the Y-axis direction, a pair of leg portions 214A and 214B disposed at respective ends of the first member 212 in the Y-axis direction, and a cylindrical member 216 as a shaft member provided to connect the leg portions 214A and 214B.

The stand 102 of the soil mixing device 10 has a pair of holding members 170A and 170B, and the holding members 170A and 170B each have a U-shaped groove 103 (also called a groove portion). The cylindrical member 216 is engaged with the U-shaped grooves 103 at two locations, and the front leg 204 is connected to the stand 102 (of the soil mixing device 10). The front leg 204 has a degree of freedom in a rotation direction (θy) about the Y-axis relative to the stand 102 with the cylindrical member 216 engaged with the U-shaped grooves 103. The U-shaped groove 103 is engaged with the cylindrical member 216 such that a horizontal direction (e.g., a horizontal direction intersecting a vertical direction) is restrained, and a rotation direction is not restrained. In other words, the front leg 204 corresponds to a first portion of the feed belt conveyor 12, which is the second unit, the U-shaped groove 103 corresponds to a first engaging portion, and the cylindrical member 216 corresponds to a second engaging portion.

Returning to FIGS. 5A and 5B, the tail stand 206 includes a rectangular frame portion 220, a plurality of (six in FIG. 5A) leg portions 222 disposed on the −Z side of the rectangular frame portion 220, a spherical bearing mechanism 224 disposed on the +Z side of the rectangular frame portion 220, and three support mechanisms 226A, 226B, and 226C as connecting portions disposed on the rectangular frame portion 220.

Each leg portion 222 has a screw-type height adjustment mechanism. Adjustment with the height adjustment mechanisms allows the tail stand 206 to be installed on the ground without rattling.

The spherical bearing mechanism 224 has the same configuration as the spherical bearing mechanism 146 described above. The spherical bearing mechanism 224 is provided between the rectangular frame portion 220 and the bottom surface of the conveyor main body 202. In other words, the spherical bearing mechanism 224 is installed on and abuts an installation surface that is the upper surface of the rectangular frame portion 220. In the present embodiment, the spherical bearing mechanism 224 corresponds to a second portion of the feed belt conveyor 12 that is the second unit. The spherical bearing mechanism 224 allows the conveyor main body 202 to have a positional change (θx) in the rotation direction about the X-axis, a positional change (θy) in the rotation direction about the Y-axis, and a positional change (θz) in the rotation direction about the Z-axis relative to the rectangular frame portion 220.

The support mechanism 226A has two pillar members 236A and 236B extending in the Z-axis direction. The support mechanism 226A supports another belt conveyor (the measuring belt conveyor 16 in the present embodiment) with the pillar members 236A and 236B. In other words, the other belt conveyor (the measuring belt conveyor 16) in the present embodiment is one of a plurality of subunits included in a third unit that performs a third process. As illustrated in an enlarged view in FIG. 6B, the support mechanism 226A is mounted to the rectangular frame portion 220 via pins 230 extending in the X-axis direction at the lower end of the pillar members 236A and 236B. This structure allows the support mechanism 226A to be rotatable about the pins 230 about the X-axis. A link 232 extending in the Y-axis direction is provided between the support mechanism 226A and the conveyor main body 202. Ball joints are provided at respective ends of the link 232 in the Y-axis direction and have degrees of freedom in the θx, θy, and θz directions. This configuration allows the conveyor main body 202 and the support mechanism 226A to maintain a constant positional relation if the position of the conveyor main body 202 changes. This configuration can maintain a substantially constant distance between the conveyor main body 202 and the upper end portions of the pillar members 236A and 236B. In the present embodiment, the pins 230 and the link 232 implement a function as a maintaining part that maintains a constant distance between the support mechanism 226A and the conveyor main body 202.

Figure 8:
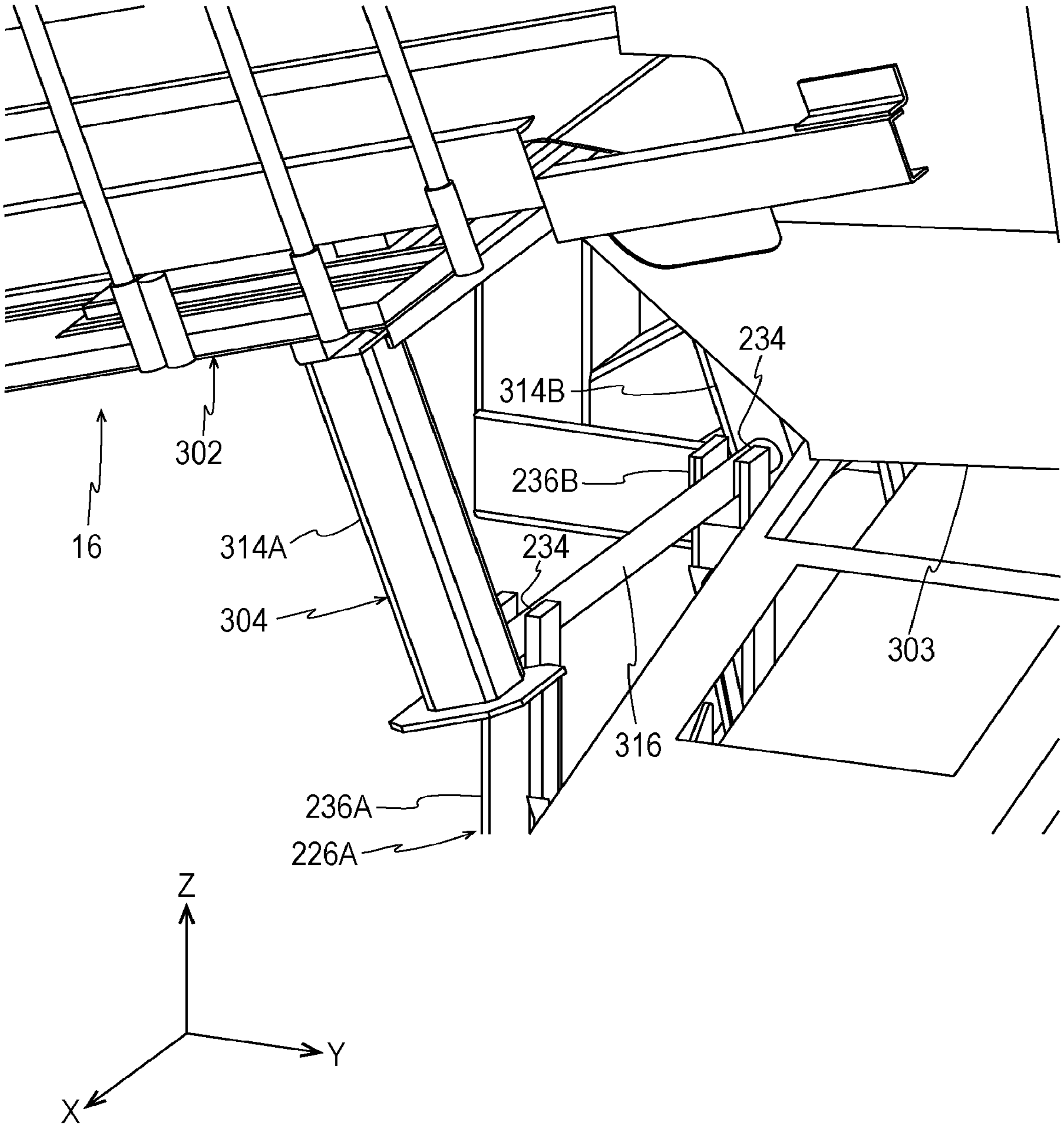
FIG. 8 is an enlarged perspective view illustrating the vicinity of a front leg of the measuring belt conveyor.

The upper end portions of the pillar members 236A and 236B of the support mechanism 226A each have a U-shaped groove 234 (see FIG. 8). Although details will be described later, the support mechanism 226A supports another belt conveyor (the measuring belt conveyor 16 in the present embodiment) with the U-shaped grooves 234.

As illustrated in FIG. 5B, the support mechanism 226B includes two pillar members 238A and 238B extending in the Z-axis direction. Upper end portions of the pillar members 238A and 238B each have a U-shaped groove 240 (see FIG. 11). The support mechanism 226B supports another belt conveyor (the measuring belt conveyor 18 in the present embodiment) with the U-shaped grooves 240. In other words, the belt conveyor 18 in the present embodiment is one of the plurality of subunits included in the third unit. The third unit in the present embodiment includes the belt conveyor 16 and the belt conveyor 18. Unlike the support mechanism 226A, the support mechanism 226B is fixed to the rectangular frame portion 220. The support mechanism 226B is disposed close to the spherical bearing mechanism 224. This configuration prevents a change in distance between the conveyor main body 202 and the upper end portions of the support mechanism 226B when the position of the conveyor main body 202 changes. In this regard, unlike the support mechanism 226A, the support mechanism 226B includes no pin or link. However, the present invention is not limited thereto, and the support mechanism 226B may have a pin and a link in the same manner as the support mechanism 226A.

The support mechanism 226C has the same configuration as the support mechanism 226B except the mount position and the mount direction. The support mechanism 226C can support another belt conveyor in the same manner as the support mechanism 226B. In the mixing system 100 of FIG. 1, the support mechanism 226C does not support any belt conveyor, but the support mechanism 226C may support another belt conveyor as necessary. At least one of the support mechanisms 226A, 226B, and 226C may support a belt conveyor, or none of the support mechanisms 226A, 226B, or 226C may support any belt conveyor.

With the soil mixing device 10 and the discharge belt conveyor 14 installed at the construction site, the feed belt conveyor 12 is suspended by a crane or the like and is installed to the position illustrated in FIG. 5A from above. The cylindrical member 216 of the front leg 204 of the feed belt conveyor 12 is engaged with the U-shaped grooves 103 (e.g., at two locations) of the holding members 170A and 170B (see FIG. 6A) provided on the stand 102 of the soil mixing device 10. The height adjustment mechanisms of the leg portions 222 are adjusted to eliminate rattling of the tail stand 206. In the feed belt conveyor 12, as illustrated in FIG. 12, the front leg 204 has a degree of freedom in the Oy direction relative to the stand 102, and the conveyor main body 202 has a degree of freedom in the z direction relative to the front leg 204. The conveyor main body 202 has degrees of freedom in the Ox, Oy, and Oz directions relative to the rectangular frame portion 220. This configuration can determine the position of the conveyor main body 202 about the X-axis in accordance with the position of the stand 102. If the rectangular frame portion 220 is inclined relative to the horizontal plane, the inclination can be absorbed by the spherical bearing mechanism 224.

In the present embodiment, the front leg 204 of the feed belt conveyor 12 is short compared to a case in which the front leg 204 directly stands on the ground. In transportation, as illustrated in FIG. 5B, a height H1 of the portion in which the front leg 204 is disposed is substantially the same as a height H2 of the portion in which the spherical bearing mechanism 224 is disposed. The height of the feed belt conveyor 12 is generally small at the time of transportation. This makes it easy to load the feed belt conveyor 12 onto the truck, thereby facilitating transportation. Because the heights H1 and H2 are substantially the same, the feed belt conveyor 12 is capable of standing in a self-standing manner when the feed belt conveyor 12 is disengaged from the soil mixing device 10. This configuration eliminates the need for, for example, an auxiliary instrument that assists self-standing of the feed belt conveyor 12 when the feed belt conveyor 12 is stored or the like.

Measuring Belt Conveyor 16

Figure 7A:
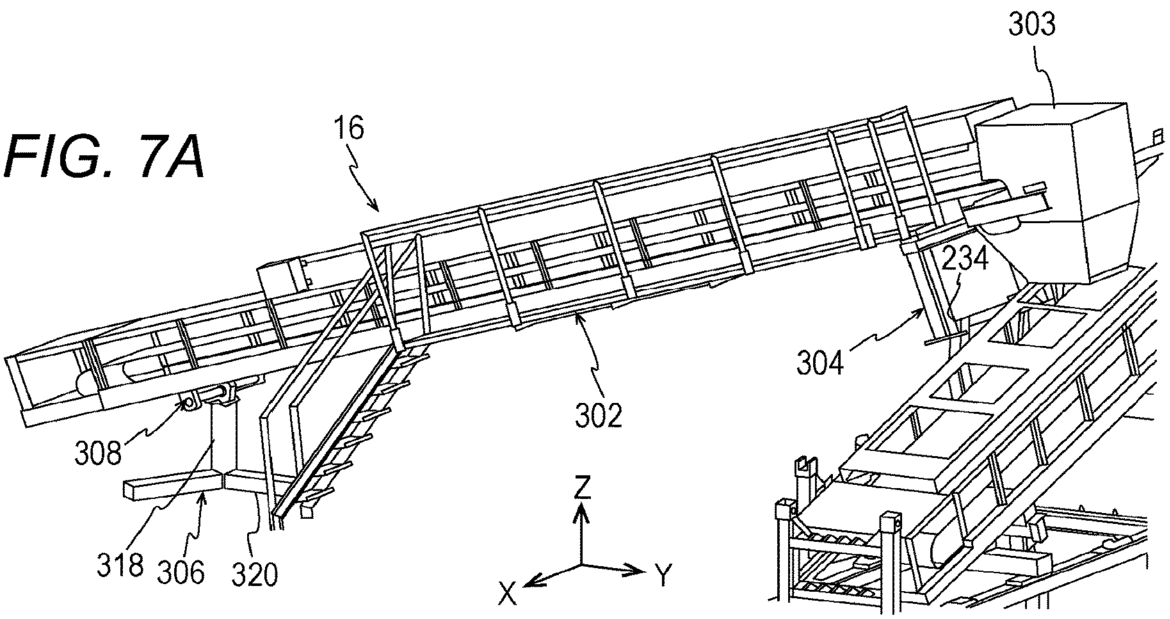
FIG. 7A is a perspective view of a measuring belt conveyor.
Figure 7B:
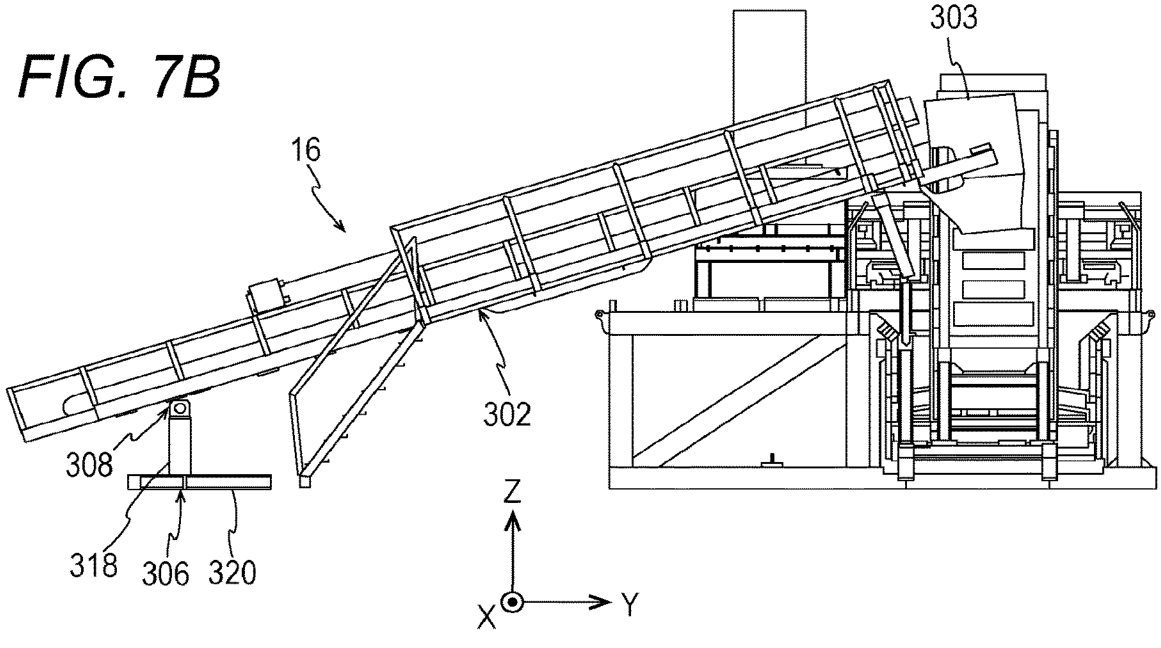
FIG. 7B is a view illustrating the measuring belt conveyor seen from the +X side.

Returning to FIG. 1, the measuring belt conveyor 16 has a function of feeding the first base material supplied from the apron feeder 20 onto the feed belt conveyor 12. FIG. 7A is a perspective view of the measuring belt conveyor 16, and FIG. 7B is a view illustrating the measuring belt conveyor 16 seen from the +X direction. As illustrated in FIGS. 7A and 7B, the measuring belt conveyor 16 includes a conveyor main body 302, a front leg 304, a tail stand 306, and a spherical bearing mechanism 308.

At an end portion on the +Y side of the conveyor main body 302, a guide 303 is provided that guides the first base material conveyed by the conveyor main body 302 to the feed belt conveyor 12. The first base material supplied from the apron feeder 20 at an end portion on the −Y side of the conveyor main body 302 is conveyed in the +Y direction by the conveyor main body 302 and supplied through the guide 303 to the feed belt conveyor 12. The conveyor main body 302 is provided with a sensor that measures the weight of the first base material. The moving speed of the belt (i.e., the conveying speed of the first base material) is controlled in accordance with the weight of the first base material.

FIG. 8 is an enlarged view illustrating the vicinity of the front leg 304. As illustrated in FIG. 8, the front leg 304 includes a pair of leg portions 314A and 314B and a cylindrical member 316 as a shaft member provided to connect the leg portions 314A and 314B. The cylindrical member 316 is engaged with the U-shaped grooves 234 of the pillar members 236A and 236B of the support mechanism 226A described above, and the front leg 304 (of the measuring belt conveyor 16) is connected to the feed belt conveyor 12.

Returning to FIGS. 7A and 7B, the tail stand 306 includes a leg portion 318 extending in the Z-axis direction and a base 320 disposed at the lower end of the leg portion 318. The spherical bearing mechanism 308 is provided between the upper end of the leg portion 318 and the bottom surface of the conveyor main body 302.

The spherical bearing mechanism 308 has the same configuration as the spherical bearing mechanisms 146 and 224. The spherical bearing mechanism 308 allows the conveyor main body 302 to have a positional change (θx) in the rotation direction about the X-axis, a positional change (θy) in the rotation direction about the Y-axis, and a positional change (θz) in the rotation direction about the Z-axis relative to the tail stand 306. The installation surface of the spherical bearing mechanism 308 is the upper end surface of the tail stand 306. The spherical bearing mechanism 308 abuts on the installation surface at one location.

With the feed belt conveyor 12 installed at the construction site, the measuring belt conveyor 16 is suspended by a crane or the like and is installed to the position illustrated in FIG. 7A from above. As illustrated in FIG. 8, the cylindrical member 316 of the front leg 304 of the measuring belt conveyor 16 is engaged with the U-shaped grooves 234 of the pillar members 236A and 236B of the support mechanism 226A. The measuring belt conveyor 16 is successfully installed and connected to the feed belt conveyor 12. In the measuring belt conveyor 16, as illustrated in FIG. 12, the front leg 304 has a degree of freedom in the ex direction relative to the support mechanism 226A. The conveyor main body 302 has degrees of freedom in the θx, θy, and θz directions relative to the tail stand 306. This configuration can determine the position of the conveyor main body 302 about the Y-axis in accordance with the position of the support mechanism 226A. If the upper surface of the tail stand 306 is inclined relative to the horizontal plane, the inclination can be absorbed by the spherical bearing mechanism 308.

In the present embodiment, because the height of the front leg 304 and that of the tail stand 306 are substantially the same, the measuring belt conveyor 16 is capable of standing in a self-standing manner when the measuring belt conveyor 16 is disengaged from the feed belt conveyor 12. This configuration eliminates the need for, for example, an auxiliary instrument that assists self-standing of the measuring belt conveyor 16 when the measuring belt conveyor 16 is stored or the like.

Apron Feeder 20

Figure 9A:
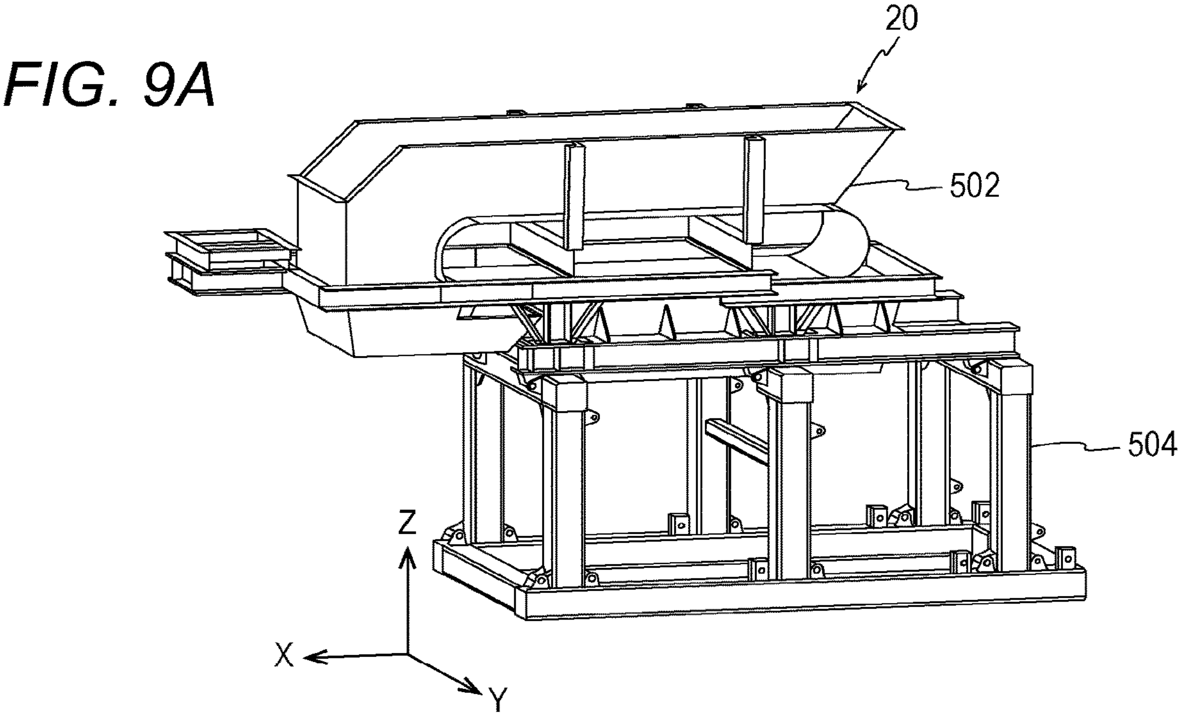
FIG. 9A and FIG. 9B are perspective views illustrating an apron feeder.

Returning to FIG. 1, the apron feeder 20 is installed on an iron plate 420 laid on the ground. FIG. 9A is a perspective view illustrating the apron feeder seen from the +Y side. The apron feeder 20 includes a feeder main body 502 and a support stand 504 that supports the feeder main body 502. The feeder main body 502 has a function of feeding the first base material onto the measuring belt conveyor 16. The iron plate 420 may not necessarily be laid on the ground.

Figure 9B:
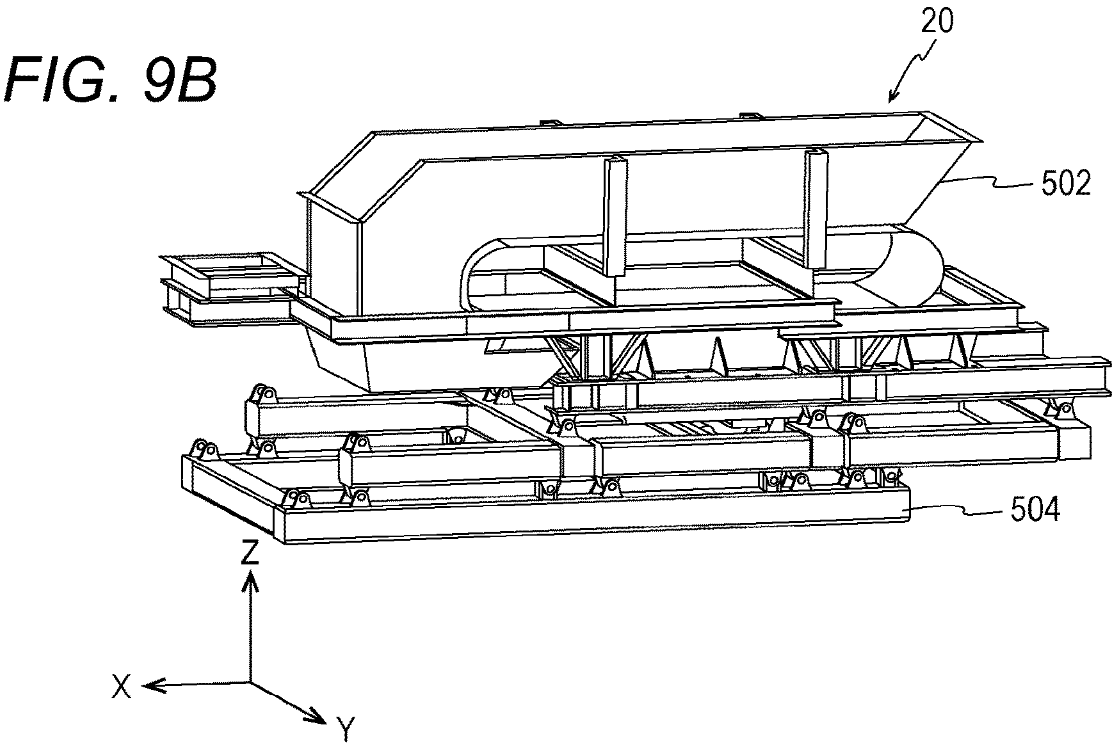

In transportation of the apron feeder 20, the support stand 504 can be folded as illustrated in FIG. 9B. This configuration facilitates transportation of the apron feeder 20 and can reduce the number of trucks required for transportation.

Measuring Belt Conveyor 18

Figure 10A:
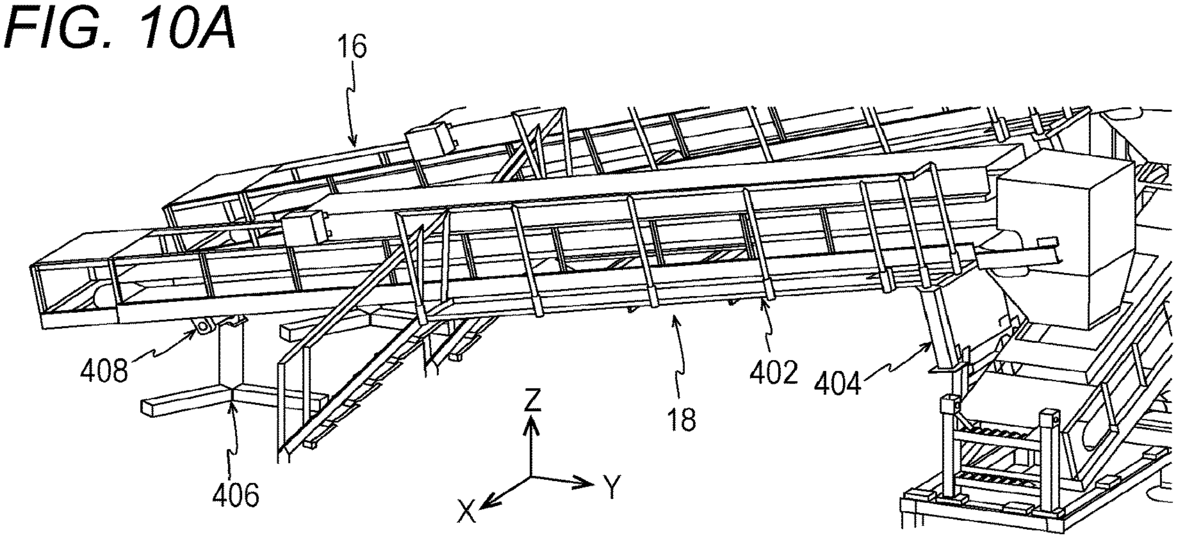
FIG. 10A is a perspective view of another measuring belt conveyor.
Figure 10B:
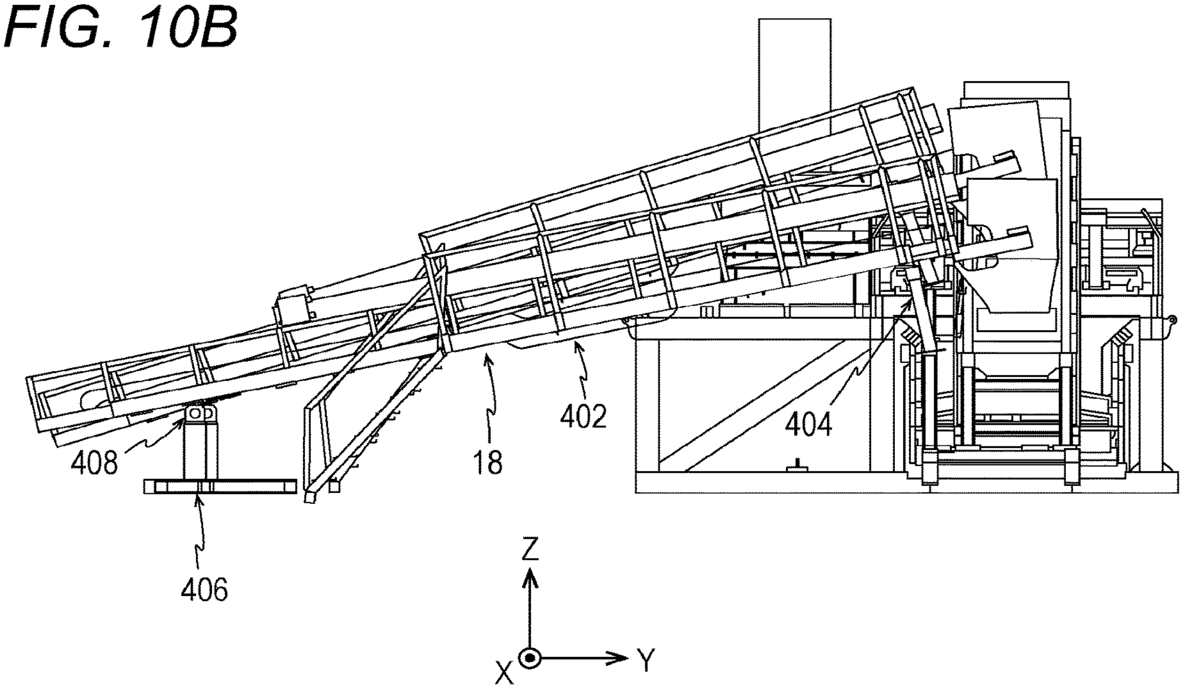
FIG. 10B is a view illustrating the other measuring belt conveyor seen from the +X direction.
Figure 11:
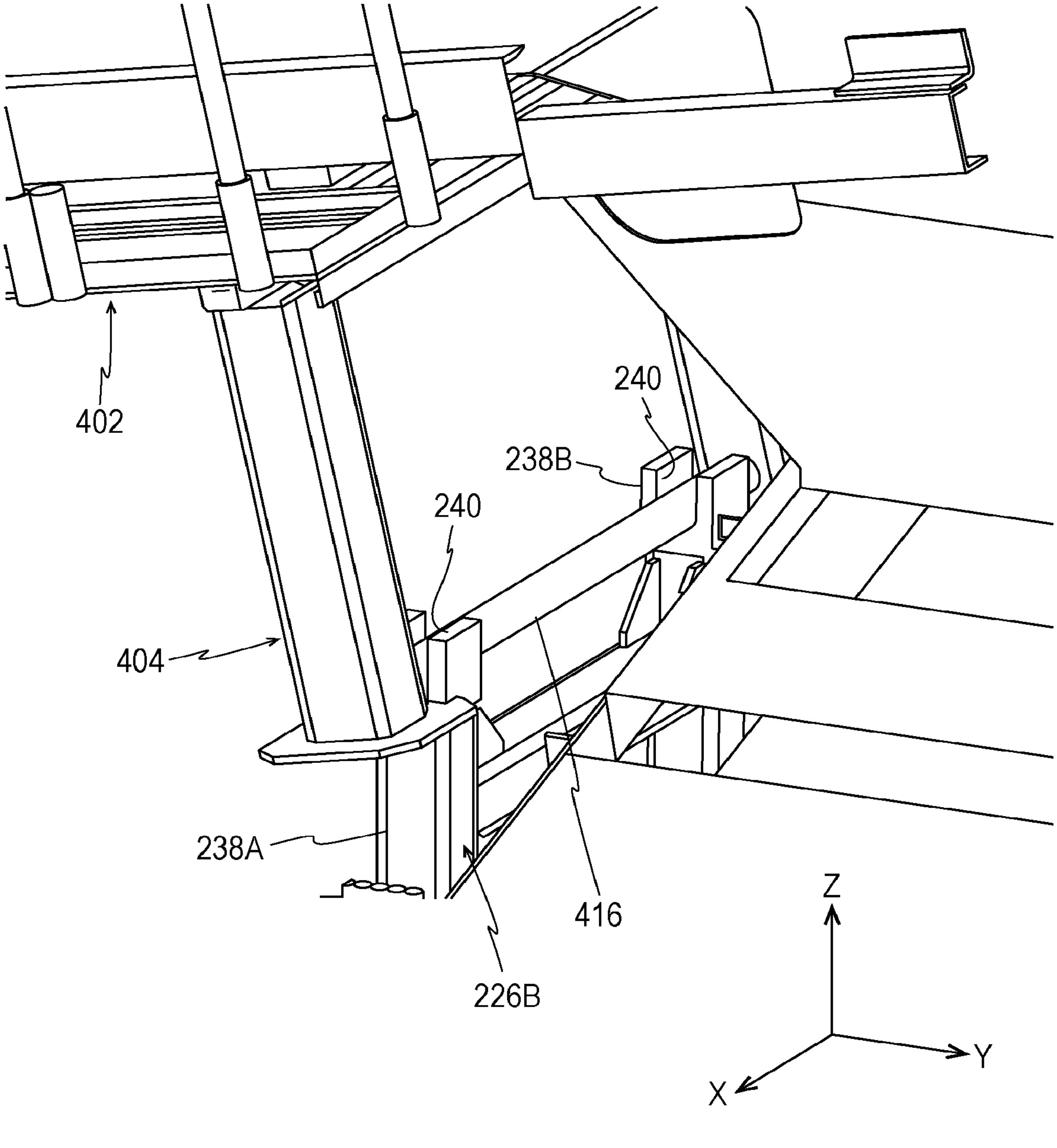
FIG. 11 is an enlarged perspective view illustrating the vicinity of a front leg of the other measuring belt conveyor.

Returning to FIG. 1, the measuring belt conveyor 18 has a function of feeding the second base material supplied from the apron feeder 22 onto the feed belt conveyor 12. FIG. 10A is a perspective view of the measuring belt conveyor 18, and FIG. 10B is a view illustrating the measuring belt conveyor 18 seen from the +X direction. FIG. 11 is an enlarged view illustrating the vicinity of a front leg 404. As illustrated in FIGS. 10A and 10B, the measuring belt conveyor 18 includes a conveyor main body 402, the front leg 404, a tail stand 406, and a spherical bearing mechanism 408, and has the same configuration as the measuring belt conveyor 16 described above. As illustrated in FIG. 11, the front leg 404 includes a cylindrical member 416 as a shaft member. The installation surface of the spherical bearing mechanism 408 is the upper end surface of the tail stand 406, and the spherical bearing mechanism 408 abuts on the installation surface at one location.

With the feed belt conveyor 12 installed at the construction site, the measuring belt conveyor 18 is suspended by a crane or the like and is installed to the position illustrated in FIG. 10A from above. As illustrated in FIG. 11, the cylindrical member 416 of the front leg 404 of the measuring belt conveyor 18 is engaged with the U-shaped grooves 240 (e.g., at two locations) of the pillar members 238A and 238B of the support mechanism 226B. The measuring belt conveyor 18 is successfully installed and connected to the feed belt conveyor 12. In the measuring belt conveyor 18, as illustrated in FIG. 12, the front leg 404 has a degree of freedom in the θx direction relative to the support mechanism 226B. The conveyor main body 402 has degrees of freedom in the θx, θy, and θz directions relative to the tail stand 406. This configuration can determine the position of the conveyor main body 402 about the Y-axis in accordance with the position of the support mechanism 226B. If the upper surface of the tail stand 406 is inclined relative to the horizontal plane, the inclination can be absorbed by the spherical bearing mechanism 408.

In the present embodiment, the measuring belt conveyor 16 and the measuring belt conveyor 18 have the same configuration. Providing at least one of the measuring belt conveyor 16 or the measuring belt conveyor 18 as a spare machine in the construction site facilitates replacement when, for example, the measuring belt conveyor 16 breaks down. This leads to good maintainability.

Apron Feeder 22

Returning to FIG. 1, the apron feeder 22 is installed on an iron plate 422 laid on the ground. The apron feeder 22 has the same configuration as the apron feeder 20 described above. The iron plate 422 may not necessarily be laid on the ground.

In the present embodiment, as described above, the units (e.g., soil mixing device 10, feed belt conveyor 12, measuring belt conveyors 16 and 18) can be connected. When there is an inclination or the like on the ground, such an inclination on the ground can be absorbed by means of the spherical bearing mechanisms 224, 308, and 408. This configuration eliminates the need for marking on the ground or the iron plate when units are installed. Furthermore, connecting the belt conveyors and the soil mixing device 10 can reduce or eliminate a change in the positional relation, thereby eliminating the fixing procedure to the ground or the iron plate.

In the present embodiment, the front legs 204, 304, and 404 of the belt conveyors 12, 16, and 18 are provided in the respective conveyor main bodies 202, 302, and 402 in advance. The conventional installation procedure for a belt conveyor has been such that the front leg is erected on the ground, the conveyor main body is carried in from above onto the front leg, and the conveyor main body is connected to the front leg. The belt conveyor 12, 16, or 18 in the present embodiment, however, eliminates the need for this procedure, thereby reducing installation labor.

As described above, the mixing system 100 includes the soil mixing device 10 that crushes and grinds construction generated soil and the feed belt conveyor 12 (conveyor main body 202) abutting on an installation surface (the upper surface of the rectangular frame portion 220), engaged with the soil mixing device 10, and configured to convey the construction generated soil to the soil mixing device 10. The number of degrees of freedom regarding the rotation of the cylindrical member 216 of the feed belt conveyor 12 engaged with the soil mixing device 10 differs from the number of degrees of freedom regarding the rotation of the spherical bearing mechanism 224 of the feed belt conveyor 12 abutting on the installation surface. This configuration can absorb inclination or the like of the installation surface when the feed belt conveyor 12 is connected to the soil mixing device 10, thereby enabling stable installation of the feed belt conveyor 12. The same configuration applies to the measuring belt conveyors 16 and 18 engaged with the feed belt conveyor 12. Connecting the measuring belt conveyors 16 and 18 to the feed belt conveyor 12 can absorb the shape (e.g., inclination or the like) of the installation surface, and the measuring belt conveyors 16 and 18 can be stably installed. It is, therefore, not always necessary to lay an iron plate on the ground when the belt conveyors 12, 16, and 18 are installed at the construction site. This configuration also eliminates the need for marking for positioning the belt conveyors. Because devices are connected, instruments for fixing these devices on the ground are also unnecessary. In this regard, it is possible to reduce or simplify the procedure of installing the mixing system 100 at the construction site. Installation of the plant-type soil improving machine known in the art has taken four days, but installation of the mixing system 100 according to the present embodiment can be completed in one day.

According to the present embodiment, the number of degrees of freedom regarding the rotation of the spherical bearing mechanisms 224, 308, and 408 of the belt conveyors 12, 16, and 18 located close to the ground is larger than the number of degrees of freedom regarding the rotation of portions (i.e., cylindrical members 216, 316, and 416) of the belt conveyors 12, 16, and 18 connected to other devices. This configuration can successfully absorb the shape (e.g., inclination or the like) of the ground and can stably connect the belt conveyors 12, 16, and 18 to other devices.

According to the present embodiment, the cylindrical members 216, 316, and 416 are engaged with other devices at two locations (i.e., the U-shaped grooves 103, 234, and 240). whereas the spherical bearing mechanism 224 abuts on an installation surface at one location. This configuration allows the cylindrical member 216 connected to the other devices to be engaged at two locations, and thus connection stability can be achieved.

The belt conveyors 12, 16, and 18 are capable of standing in a self-standing manner when they are disengaged from other devices. This configuration eliminates the need for, for example, an auxiliary instrument that assists self-standing of the belt conveyors 12, 16, and 18 when they are disengaged from the other devices such as at the time of transportation or before engaging operation.

In the present embodiment, the feed belt conveyor 12 includes a plurality of support mechanisms 226A, 226B, and 226C to which belt conveyors can be connected. This structure allows for a change in the configuration of the mixing system 100 in accordance with the size of the construction site, the land shape, and the number of types of base materials to be mixed.

In the present embodiment, the feed belt conveyor 12 includes the pins 230 and the link 232 that maintain a substantially constant distance between the conveyor main body 202 and the U-shaped grooves 234 of the support mechanism 226A. If the position of the conveyor main body 202 is changed, this configuration can reduce or eliminate a change in position of the guide 303 of the measuring belt conveyor 16 relative to the conveyor main body 202.

In the present embodiment, the belt conveyors 12, 16, and 18 are connected to other devices such that the spherical bearing mechanisms 224, 308, and 408 abut on a surface close to the ground and the cylindrical members 216, 316, and 416 are engaged with the U-shaped grooves 103, 234, and 240 with the position of the other devices being kept in a certain state. This configuration allows the belt conveyors 12, 16, and 18 to be installed appropriately in accordance with the position of other devices and the shape (e.g., inclination or the like) of the ground.

In the present embodiment, because the belt conveyors 12, 16, and 18 are not fixed by an angle member or the like, it is possible to shorten the time for withdrawing the mixing system 100 from the construction site. This configuration allows, for example, if workers start withdrawing the mixing system 100 upon receiving information on a typhoon approaching, the workers may complete withdrawal of the mixing system 100 before the typhoon strikes.

In the embodiment above, for example, the front leg 204 of the feed belt conveyor 12 is mounted to the conveyor main body 202 via the Z rotation shaft 210, but the present invention is not limited thereto. The front leg 204 may be directly fixed to the conveyor main body 202 without using the Z rotation shaft 210. The front legs 304 and 404 of the measuring belt conveyors 16 and 18 may be mounted to the conveyor main bodies 302 and 402 via a Z rotation shaft in the same manner as the feed belt conveyor 12.

The degrees of freedom described in the embodiment above are presented for illustrative purposes only. The degrees of freedom may be any other degrees if the degrees of the portion (e.g., first portion) engaged with another device differ from the degrees of freedom of the portion (e.g., second portion) abutting on the ground or the like.

In the embodiment above, no iron plate is laid below the belt conveyor 12, 16, or 18, but the present invention is not limited thereto. The iron plate may be laid.

In the embodiment above, the discharge belt conveyor 14 may have the same configuration as the other belt conveyors 12, 16, and 18.

In the embodiment above, the mixing system 100 has been described as an apparatus to which the present invention is applied, but this use of the invention is not limiting. For example, the embodiment above may be applied to the units (e.g., soil washing facility, conveyor, and the like) included in a soil washing plant as described in JP 2007-175585 A. The embodiment above may be applied to the units (e.g., crusher, conveyor, and the like) included in a plant that crushes concrete or gravel. The present invention may be applied to a separation plant as described in JP 2006-000780 A. The embodiment above may be applied to a continuous conveyor for conveying tunnel excavation soil as described in JP 2000-213287 A. The embodiment above may be applied to a conveyor installed between a marine facility and a land facility. In this case, it is easy to install the conveyor between the facilities, and if the marine facility swings due to, for example, a tide change or waves, the conveyor can follow the swings. Furthermore, the embodiment above may be applied to a discharge conveyor for shaft excavation soil as described in JP 2020-179973 A. This makes it possible to, when there is need for increasing the number of discharge conveyors in accordance with the construction site, easily add discharge conveyors.

Modification

Figure 13:
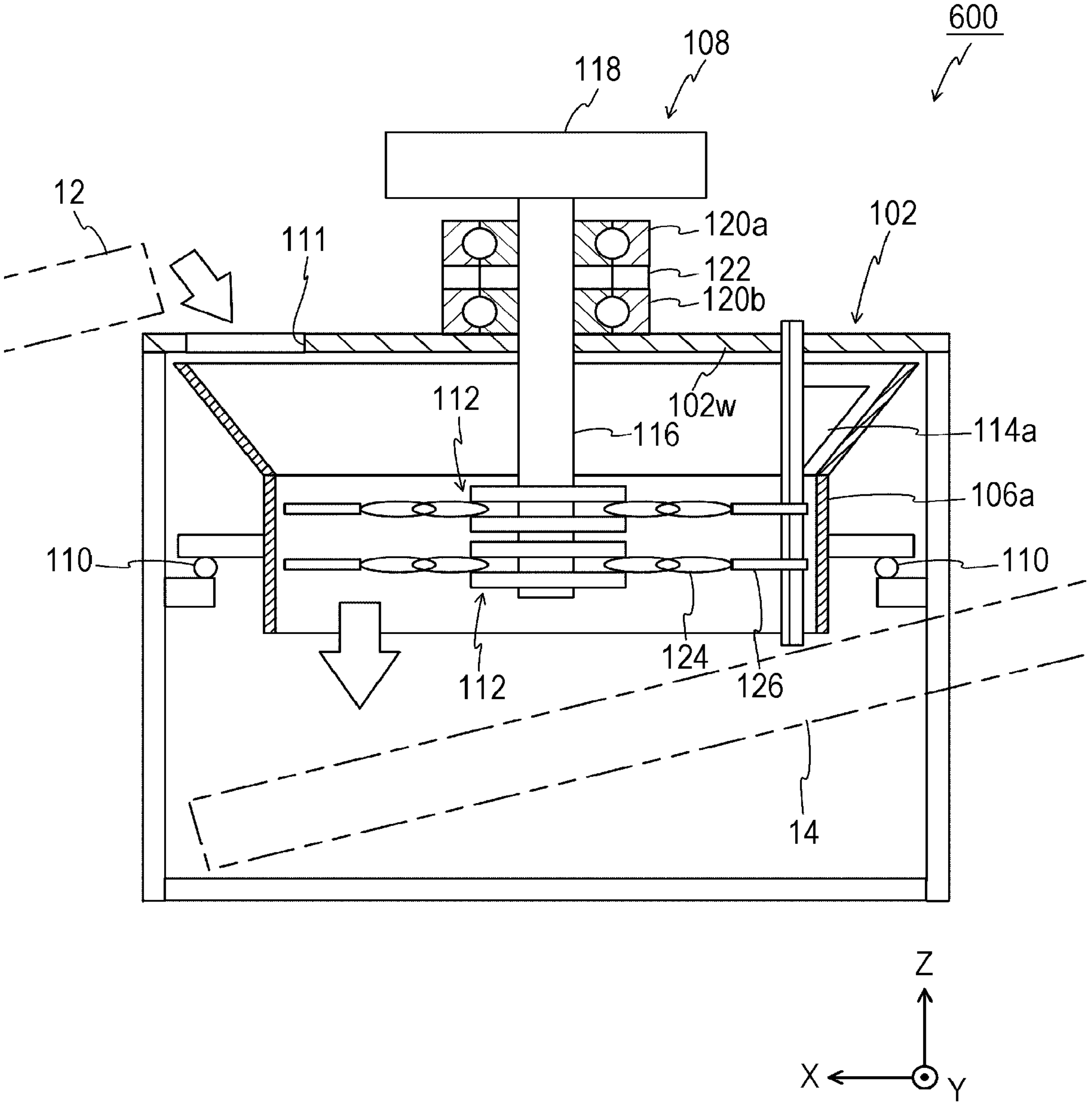
FIG. 13 is a partial sectional view of a soil mixing device according to a modification of the embodiment of FIG. 1.

The following describes a modification of the soil mixing device 10 with reference to FIG. 13. The same constituents as those of the embodiment above are denoted by the same reference signs, and the description thereof will be omitted or simplified.

FIG. 13 is a partial sectional view illustrating a soil mixing device 600 according to the modification seen from the +Y side.

The soil mixing device 600 according to the modification illustrated in FIG. 13 includes no fixed drum 104 illustrated in FIG. 2 but includes a rotary drum 106*a* extended in the +Z direction. Because the rotary drum 106*a* is extended, the shape of a feeding port member 111 is modified accordingly. Specifically, the feeding port member 111 according to the modification is an opening provided in a top plate 102*w* of a stand 102.

The portion extended in the +Z direction of the rotary drum 106*a* has a larger diameter toward the +Z direction and defines a tapered shape (also called a tapered portion). The processing object fed from the feeding port member 111 is crushed by impact members 112. A portion of the processing object may adhere to the tapered portion. A scraping rod 114*a* includes a straight rod portion as described in the embodiment above and a triangular portion for scraping off the processing object (e.g., construction generated soil) adhering to the inner side of the tapered portion. The shape of the scraping rod 114*a* of the present modification is not limited to a triangular shape. The scraping rod 114*a* may be shaped in conformance to the shape of the tapered portion. This configuration can scrape off the processing object (e.g., construction generated soil) adhering to the inner side of the tapered portion, whereby maintainability can be improved.

The soil mixing device 10 and the soil mixing device 600 of the present modification each have an opening mechanism (also called an inspection port) (not illustrated) in the upper portion of the stand 102. The soil mixing device 600 has the tapered portion expanding in the +Z direction, and when the opening mechanism is opened, the opening area is larger than that of the soil mixing device 10. This configuration allows people to easily move in and out of the soil mixing device 600 through the opening mechanism and eliminates a feeling of pressure, whereby maintainability can be improved.

The embodiments described above are preferred embodiments of the present invention. However, the present invention is not limited thereto, and various modifications can be made without departing from the scope of the present invention.

The following is a list of reference signs used in this specification and in the drawings.

10 Soil mixing device (rotary crushing part)
12 Feed belt conveyor
14 Discharge belt conveyor
16 Measuring belt conveyor (subunit)
18 Measuring belt conveyor (subunit)
20 Apron feeder
22 Apron feeder
24 Powder feeder
100 Mixing system (construction apparatus)
102 Stand
102*w* Top plate
103 U-shaped groove
104 Fixed drum
106 Rotary drum
108 Rotation mechanism
106*a* Rotary drum (container)
110 Support roller
111 Feeding port member
112 Impact member (crushing part)
114 Scraping rod
114*a* Scraping rod (scraping part)
116 Rotation shaft
118 Pulley
120*a* Ball bearing
120*b* Ball bearing
122 Spacer
124 Chain
126 Plate
130 Iron plate
142 Conveyor main body
144 Front leg
145A Leg portion
145B Leg portion
146 Spherical bearing mechanism
148 Rotation shaft
150 Height adjustment mechanism
152 Housing
154 Spherical bearing member
155 Motor
156 Cylindrical member
160 Floor member
162 Fixing member
163 Beam member
170A Holding member
170B Holding member
202 Conveyor main body
203 Guide member
204 Front leg
206 Tail stand
210 Z rotation shaft
212 First member
214A Leg portion
214B Leg portion
216 Cylindrical member (shaft member)
220 Rectangular frame portion
222 Leg portion
224 Spherical bearing mechanism (spherical bearing)
226A Support mechanism (connecting portion)
226B Support mechanism (connecting portion)
226C Support mechanism (connecting portion)

230 Pin (part of maintaining part)
232 Link (part of maintaining part)
234 U-shaped groove
236A Pillar member
236B Pillar member
238A Pillar member
238B Pillar member
240 U-shaped groove
302 Conveyor main body
303 Guide
304 Front leg
306 Tail stand
308 Spherical bearing mechanism
308 Spherical bearing mechanism (spherical bearing)
314A Leg portion
314B Leg portion
316 Cylindrical member (shaft member)
318 Leg portion
320 Base
402 Conveyor main body
404 Front leg
406 Tail stand
408 Spherical bearing mechanism (spherical bearing)
416 Cylindrical member (shaft member)
420 Iron plate
422 Iron plate
502 Feeder main body
504 Support stand
600 Soil mixing device (construction apparatus)

The invention claimed is:

1. A construction apparatus, comprising:
a first unit configured to execute a first process on a processing object and that includes:
a shaft member; and
two groove portions that rotatably support the shaft member about an axis; and
a second unit abutting on an installation surface, engaged with the first unit, and configured to execute a second process on the processing object, wherein a number of degrees of freedom regarding rotation of a first portion of the second unit, the first portion being engaged with the first unit and including a shaft member, differs from a number of degrees of freedom regarding rotation of a second portion of the second unit, the second portion abutting on the installation surface.

2. The construction apparatus according to claim 1, wherein the number of degrees of freedom regarding rotation of the second portion is larger than the number of degrees of freedom regarding rotation of the first portion.

3. The construction apparatus according to claim 1, wherein:
the first portion is engaged with the first unit at two locations; and
the second portion abuts on the installation surface at one location.

4. The construction apparatus according to claim 1, wherein the second unit abuts on the installation surface and is engaged with the first unit with a position of the first unit relative to at least one of a vertical direction or a horizontal direction intersecting the vertical direction being kept in a certain state.

5. The construction apparatus according to claim 1, wherein the number of degrees of freedom of the second portion of the second unit is determined by a spherical bearing.

6. The construction apparatus according to claim 1, wherein the second unit is capable of standing in a self-standing manner using the first portion and the second portion when the first unit and the second unit are disengaged.

7. The construction apparatus according to claim 1, wherein the second unit comprises a stand that is installed on a ground and a main body that is installed on the stand and engaged with the first unit.

8. The construction apparatus according to claim 7, wherein when engagement between the first unit and the second unit is disengaged, the second unit is capable of standing on the ground by a leg provided in the first portion and the stand.

9. A construction apparatus, comprising:
a first unit configured to execute a first process on a processing object:
a second unit abutting on an installation surface, engaged with the first unit, and configured to execute a second process on the processing object, and
a third unit engaged with the second unit and configured to execute a third process on the processing object, wherein:
a number of degrees of freedom regarding rotation of a first portion of the second unit, the first portion being engaged with the first unit, differs from a number of degrees of freedom regarding rotation of a second portion of the second unit, the second portion abutting on the installation surface, and
a number of degrees of freedom regarding rotation of a portion of the third unit, the portion being engaged with the second unit, differs from a number of degrees of freedom regarding rotation of an other portion of the third unit, the other portion abutting on the installation surface.

10. The construction apparatus according to claim 9, wherein the third unit includes a plurality of subunits, and the second unit includes a plurality of connecting portions to which the plurality of subunits are connected.

11. The construction apparatus according to claim 10, further comprising:
a maintaining part configured to maintain a constant distance between the second unit and at least one of the plurality of connecting portions.

12. A construction apparatus comprising:
a first unit configured to execute a first process on a processing object, and
a second unit abutting on an installation surface, engaged with the first unit, and configured to execute a second process on the processing object, wherein;
the first unit includes a first engaging portion and a rotary crushing part configured to crush raw material soil as the first process,
the second unit includes a second engaging portion and a belt conveyor configured to convey the raw material soil to the rotary crushing part as the second process,
the first engaging portion and the second engaging portion are engaged such that a horizontal direction is restrained and a rotation direction is not restrained, and
a number of degrees of freedom regarding rotation of a first portion of the second unit the first portion being engaged with the first unit, differs from a number of degrees of freedom regarding rotation of a second portion of the second unit, the second portion abutting on the installation surface.

13. An assembling method for a construction apparatus, comprising:

engaging a second engagement portion of a second unit with a first engagement portion having a first rotational degree of freedom above a ground of a first unit installed on the ground, wherein the second unit has a stand with the first rotational degree of freedom and a second rotational degree of freedom that is different from the first rotational degree of freedom, and wherein the second unit is capable of standing on the ground by a leg near the second engagement portion and the stand when the first unit and the second unit are not engaged; and adjusting an inclination of the stand with respect to the ground by means of the first rotational degree of freedom and the second rotational degree of freedom of the stand when the stand is installed on the ground.

14. The assembling method according to claim 13, wherein adjusting the inclination of the stand with respect to the ground uses a spherical bearing.

* * * * *